United States Patent
Seo (10) Patent No.: US 10,892,127 B2
(45) Date of Patent: Jan. 12, 2021

(54) CONTACTOR ASSEMBLY FOR DISTRIBUTION BOARD

(71) Applicant: LSIS CO., LTD., Anyang-si (KR)

(72) Inventor: Jae-Kwan Seo, Anyang-si (KR)

(73) Assignee: LSIS CO., LTD., Anyang-si (KR)

(*) Notice: Subject to any disclaimer, the term of this patent is extended or adjusted under 35 U.S.C. 154(b) by 0 days.

(21) Appl. No.: 16/583,727

(22) Filed: Sep. 26, 2019

(65) Prior Publication Data

US 2020/0161070 A1 May 21, 2020

(30) Foreign Application Priority Data

Nov. 21, 2018 (KR) .................. 10-2018-0144531

(51) Int. Cl.
*H01H 71/08* (2006.01)
*H01H 71/10* (2006.01)
*H02B 1/20* (2006.01)

(52) U.S. Cl.
CPC ........ *H01H 71/08* (2013.01); *H01H 71/1009* (2013.01); *H02B 1/20* (2013.01)

(58) Field of Classification Search
CPC .... H01R 13/6315; H01R 13/18; H01H 71/08; H01H 71/1009; H02B 1/20
USPC .................. 439/249–251, 819, 821
See application file for complete search history.

(56) References Cited

U.S. PATENT DOCUMENTS

| | | | | |
|---|---|---|---|---|
| 2,300,893 A | * | 11/1942 | Hayford | H02B 11/04 439/821 |
| 2,303,425 A | * | 12/1942 | Bickham | H01H 1/42 439/251 |
| 3,201,556 A | * | 8/1965 | Baird | H01H 1/42 439/251 |
| 4,983,132 A | * | 1/1991 | Weidler | H01R 25/162 439/251 |
| 5,098,318 A | * | 3/1992 | Suter | H02B 11/04 200/255 |

(Continued)

FOREIGN PATENT DOCUMENTS

CN 102386508 A 3/2012
EP 0926793 A1 6/1999

(Continued)

OTHER PUBLICATIONS

Korean Notice of Allowance dated Feb. 26, 2020 for related Korean Application No. 10-2018-0144531; (2 pages).

(Continued)

*Primary Examiner* — Gary F Paumen
(74) *Attorney, Agent, or Firm* — K&L Gates LLP (57) ABSTRACT

A contactor assembly is connected to a bus-bar of a main circuit-breaker. The assembly includes a housing including an opening defined therein; a contactor passing through the opening, wherein the contactor includes contacting portions projecting forwardly of the opening and coupled portions projecting rearwardly of the opening; a presser passing through the opening, wherein the presser is interposed between the contactor and the housing, wherein the presser is supported on the housing and presses the contacting portions and the coupled portions; and a connector coupled to the coupled portions of the contactor and electrically connected to the contactor.

6 Claims, 4 Drawing Sheets

(56) References Cited

U.S. PATENT DOCUMENTS

| | | | | |
|---|---|---|---|---|
| 5,807,145 | A * | 9/1998 | Deylitz | H01H 1/42 |
| | | | | 439/249 |
| 6,086,398 | A * | 7/2000 | Ookawa | H01R 13/18 |
| | | | | 439/251 |
| 6,139,347 | A * | 10/2000 | Nebon | H02B 11/04 |
| | | | | 439/251 |
| 7,795,551 | B2 * | 9/2010 | Narayanan | H01H 1/42 |
| | | | | 200/255 |
| 8,197,289 | B1 * | 6/2012 | Faber | H02B 11/04 |
| | | | | 439/819 |
| 9,847,200 | B1 | 12/2017 | Park | |
| 2009/0047814 | A1 | 2/2009 | Daamen | |
| 2016/0020052 | A1 * | 1/2016 | Kaufman | H01H 71/0207 |
| | | | | 439/121 |

FOREIGN PATENT DOCUMENTS

| | | |
|---|---|---|
| EP | 3618092 A1 | 3/2020 |
| JP | H11-126669 A | 5/1999 |
| KR | 20110047455 A | 5/2011 |
| KR | 10-1541196 B1 | 8/2015 |
| KR | 10-2017-0033720 A | 3/2017 |
| KR | 20110047455 A | 3/2017 |
| WO | WO 2014/142788 A1 | 9/2014 |

OTHER PUBLICATIONS

European Search Report dated May 4, 2020 for related European Application No. 19199350.0; (9 pages).
Japanese Office Action for related Japanese Application No. 2019-173110; dated Oct. 2, 2020; (4 pages).

* cited by examiner

CONTACTOR ASSEMBLY FOR DISTRIBUTION BOARD

CROSS-REFERENCE TO RELATED APPLICATIONS

Pursuant to 35 U.S.C. § 119(a), this application claims the benefit of earlier filing date and right of priority to Korean Application No. 10-2018-0144531 filed on Nov. 21, 2018, in the Korean Intellectual Property Office, the disclosure of which is hereby incorporated by reference in its entirety.

BACKGROUND

1. Technical Field

The present disclosure relates to a contactor assembly connecting a branching circuit-breaker and a main circuit-breaker with each other in a distribution board.

2. Description of the Related Art

In general, a distribution board receives power from a main line and distributes the power according to a purpose. The distribution board includes a main circuit-breaker connected to the main line. The main circuit-breaker is connected to multiple branching circuit-breakers to distribute power through each branching circuit-breaker.

Therefore, the distribution board has a structure in which the plurality of branching circuit breakers are electrically connected to the main circuit breaker. In this connection, the electrical connection between the main circuit-breaker and each branching circuit-breaker is made via a general coated power wire. This coated power wire based connection may be useful when the main circuit-breaker and branching circuit-breakers are fixed and when a power interruption does not occur except for maintenance or repair purposes.

However, for most of the distribution boards used in industrial sites, the main circuit-breaker and branching circuit-breakers should be replaced or removed for various reasons, for example, for changing of power capacity of a branch wire.

Nowadays, a bus-bar is disposed in the main circuit-breaker. A contactor may allow each branching circuit-breaker to be easily coupled to or detached from the bus-bar.

The contactor used in the conventional distribution board has two branched ends. The bus-bar is fitted with the two branched ends of the contactor. When an operator moves the contactor or bus-bar in one direction, the contactor and bus-bar are separated from each other.

However, the bifurcated tongs type contactor has a disadvantage in that durability deteriorates due to fatigue accumulation in the contactor due to repeated coupling and disconnection.

Further, the branching circuit-breaker with a large rated current has to secure a wide area where the contactor is in contact with the bus-bar. However, in order to increase the contact area between the contactor and the bus-bar, the contactor must also be large in volume.

Therefore, a method for solving such problems is required.

SUMMARY

The present disclosure is devised to solve the above-mentioned problems of the prior art. The present disclosure is to provide a contactor assembly which may be easily connected to the bus-bar of the main circuit-breaker and has a small volume while having high durability.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a contactor assembly connected to a bus-bar of a main circuit-breaker, the assembly including: a housing including an opening defined therein; a contactor passing through the opening and coupled to the housing, wherein the contractor includes contacting portions projecting forwardly of the opening and coupled portions projecting rearwardly of the opening; a presser passing through the opening and coupled to the housing, wherein the presser is interposed between the contactor and the housing, wherein the presser is supported on the housing and presses the contacting portions and the coupled portions; and a connector coupled to the coupled portions of the contactor and electrically connected to the contactor.

In one implementation of the contactor assembly, the contactor includes first and second contacting branches, wherein the first and second contacting branches have middle portions received in the opening and being in contact with each other, wherein front ends of the first and second contacting branches in front of the opening are spaced from each other by a predefined spacing, while rear ends of the first and second contacting branches in rear of the opening are spaced from each other by a predefined spacing.

In one implementation of the contactor assembly, the first and second contacting branches includes the coupled portions respectively, wherein at least a portion of the connector is fitted into a space between the coupled portions.

In one implementation of the contactor assembly, the connector includes protrusion protruding outwardly therefrom and having a circular cross section, wherein the protrusion is fitted into a space between the coupled portions, wherein the contactor rotates around the protrusion.

In one implementation of the contactor assembly, the first and second contacting branches includes the contacting portions respectively, wherein an end of the bus-bar is fitted into a space between the contacting portions.

In one implementation of the contactor assembly, the presser includes: a first pressing piece sandwiched between the first contacting branch and the housing; and a second pressing piece sandwiched between the second contacting branch and the housing.

In one implementation of the contactor assembly, the housing includes both side guards defining both side boundaries of the opening respectively, wherein the connector is connected to the coupled portions while the coupled portions and a least a portion of the connector are received between the both side guards.

In one implementation of the contactor assembly, each of the both side guards includes a spacer protruding toward a center of the opening, wherein each of both sides of the contactor contacts each spacer such that each of both sides of the contactor is spaced apart by a predetermined gap from each side guard.

In one implementation of the contactor assembly, each of the both side guards is a plate-like member having a plane to perpendicular to an imaginary plane defined by the opening, and the both side guards defines both sides of the openings respectively.

Effects of the present disclosure are as follows but are not limited thereto.

The contactor assembly according to the present disclosure has an effect of being easily combined with and separated from the bus-bar of the main circuit-breaker. Further, the durability of the contactor is reliable due to a lowered fatigue of the contactor even after repeated coupling and detachment. The contactor assembly according to the present disclosure has the advantage that the assembly may be realized in a relatively small volume at the same rated current.

In addition to the effects as described above, specific effects of the present disclosure are described together with specific details for carrying out the present disclosure.

DETAILED DESCRIPTIONS

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, contactor assemblies according to some embodiments according to the present disclosure will be described.

Figure 1:
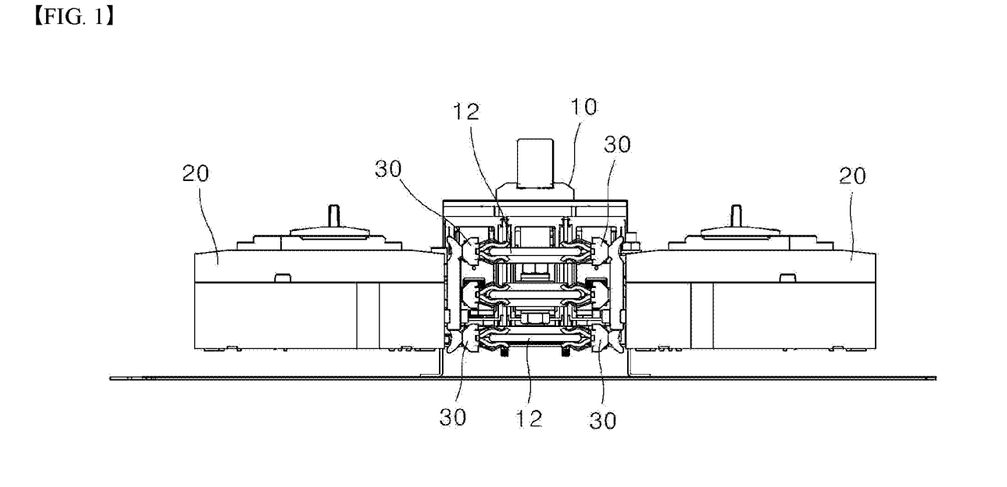
FIG. 1 shows a state in which a contactor assembly according to an embodiment of the present disclosure is coupled to a distribution board.
Figure 2:
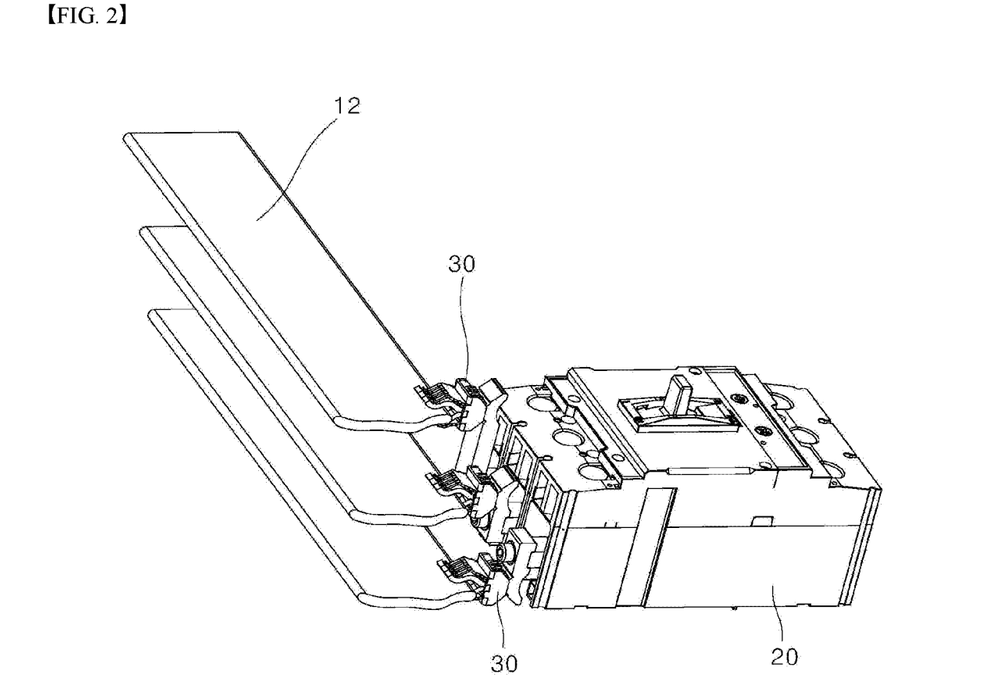
FIG. 2 shows a state in which a contactor assembly according to one embodiment of the present disclosure is coupled to a bus-bar.

FIG. 1 shows a state in which a contactor assembly according to an embodiment according to the present disclosure is coupled to a distribution board. FIG. 2 shows a state in which a contactor assembly is coupled to a bus-bar according to one embodiment of the present disclosure.

As shown in FIG. 1 and FIG. 2, the contactor assembly 30 according to the present disclosure electrically connects a main circuit-breaker 10 connected to a main line to a number of branching circuit-breakers 20.

Specifically, the contactor assembly 30 according to the present disclosure is coupled with a bus-bar 12 provided in the main circuit-breaker 10 while being electrically connected to the branching circuit-breakers 20. The bus-bar 12 in the main circuit-breaker 10 may be electrically connected to the number of branching circuit-breakers 20.

Figure 3:
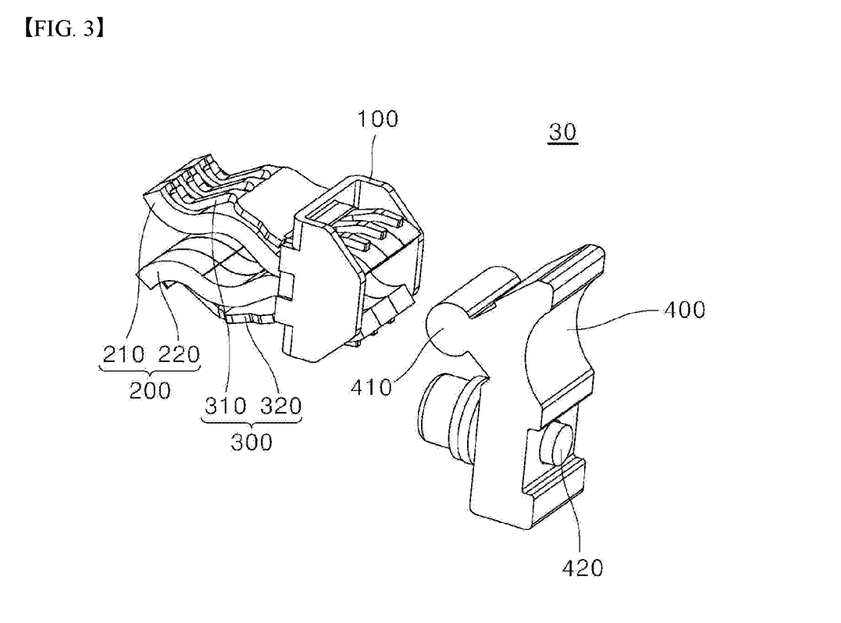
FIG. 3 is a perspective view of a contactor assembly according to one embodiment according to the present disclosure.
Figure 4:
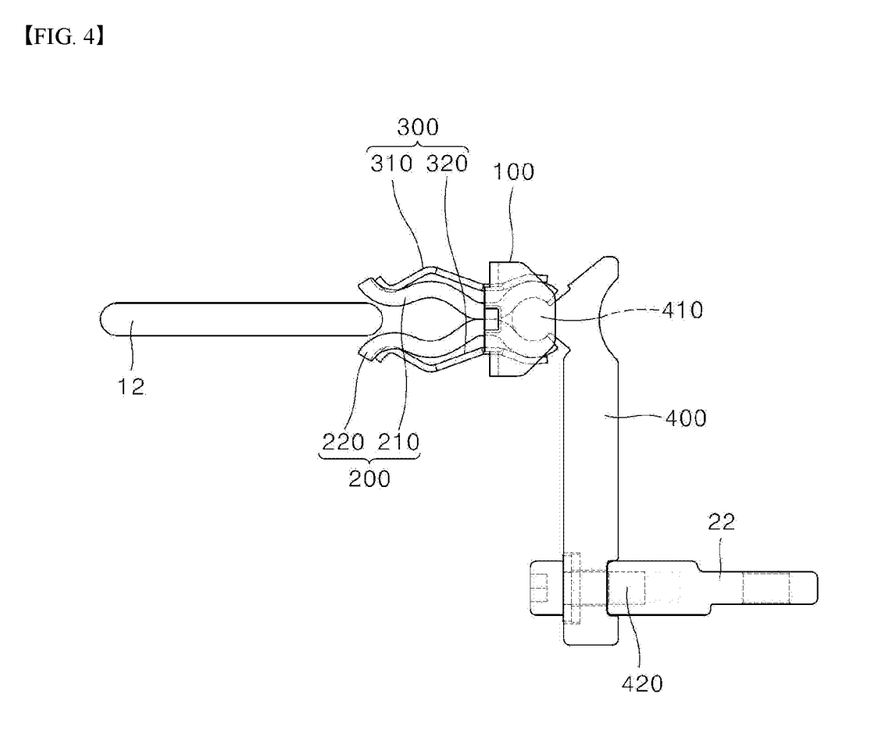
FIG. 4 is a front view of a contactor assembly according to one embodiment of the present disclosure.

FIG. 3 is a perspective view of a contactor assembly according to an embodiment according to the present disclosure. FIG. 4 is a front view of a contactor assembly according to one embodiment of the present disclosure. Then, FIG. 5 is a perspective view of a housing of the contactor assembly according to an embodiment according to the present disclosure.

Figure 5:
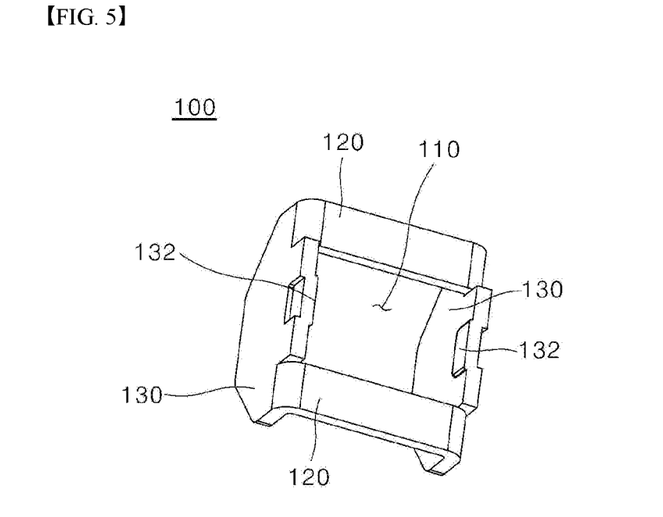
FIG. 5 is a perspective view showing a housing of a contactor assembly according to an embodiment according to the present disclosure.

Referring to FIG. 3 to FIG. 5, the contactor assembly 30 according to the present disclosure includes a housing 100, a contactor 200, a presser 300 and a connector 400.

The housing 100 includes an opening 110 defined therein. The contactor 200 is coupled to the housing 100 through the opening 110. The contactor 200 includes contacting portions 212 and 222 projecting forwardly of the opening 110 and coupled portions 216 and 226 projecting backwardly of the opening 110.

The presser 300 is coupled to the housing 100 through the opening 110. The presser 300 may be fitted into between the contactor 200 and the housing 100. The presser 300 is supported in the housing 100 to pressurize the contacting portions 212 and 222 and the coupled portions 216 and 226 of the contactor 200.

The connector 400 is coupled to the coupled portions 216 and 226 of the contactor 200 and is electrically connected to the contactor 200. Eventually, the connector 400 electrically connect the branching circuit-breaker 20 to the contactor 200.

Further, the connector 400 may include a terminal-connecting portion 420. A connecting terminal 22 may be coupled to the terminal-connecting portion 420. The connector 400 may be electrically connected to the branching circuit-breaker 20 via the connecting terminal 22.

The connection of the terminal-connecting portion 420 and the connecting terminal 22 may be realized such that male and female threads formed in the terminal-connecting portion 420 and the connecting terminal 22 are engaged with each other and a bolt through the terminal-connecting portion 420 may be fixed to the connecting terminal 22.

A following description describes each of the components in detail with reference to FIG. 4 and FIG. 5.

As shown in FIG. 5, the housing 100 includes the opening 110 formed by cutting a plate's center into a rectangle shape. Upper and lower boundaries of the opening 110 may be defined by upper and lower front guards 120. Both side guards 130 define both side boundaries of the opening 110.

Specifically, the upper and lower front guards 120 may be embodied as frames positioned at the top and bottom of the opening 110 in the housing 100 respectively. The both side guards 130 may be embodied as frames positioned at the both sides of the opening 110 in the housing 100 respectively.

The both side guards 130 of the housing 100 may be formed by folding both sides of the integrally formed housing 100 in the same direction. Each side guard 130 has a plane perpendicular to a plane of the opening 110.

Each side guard 130 includes a spacer 132 protruding from an inner side thereof facing the opening 110 toward the opening 110.

Figure 6:
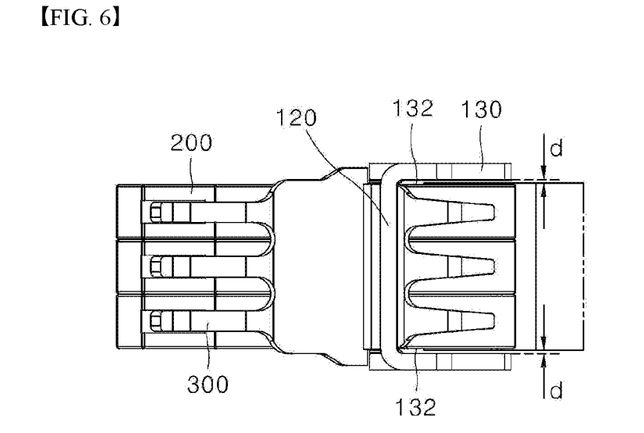
FIG. 6 is a plan view of a contactor assembly according to one embodiment according to the present disclosure.

FIG. 6 is a plan view of a contactor assembly according to one embodiment according to the present disclosure.

As shown in FIG. 6, the both spacers 132 may be in contact with both sides of the contactor 200 respectively in a state where the contactor 200 and the presser 300 to be described later penetrate the opening 110 and is coupled to the housing 100. Therefore, the contactor 200 may be spaced apart from each side guard 130 by a distance d by which each spacer 132 protrudes from each side guard 130. This configuration minimizes an area where both sides of the contactor 200 come into contact with both side guards 130 respectively to prevent constraint of an up and down movement of the contactor 200 that may occur if the contactor 200 interferes with both side guards 130.

Figure 7:
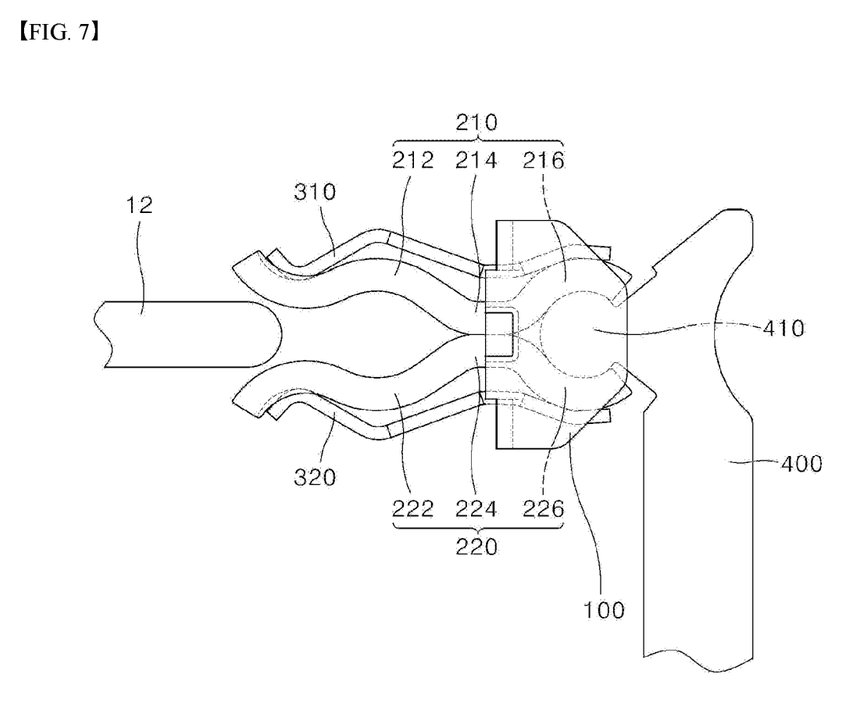
FIG. 7 illustrates a state in which a contactor and a presser are coupled to a housing of a contactor assembly according to an embodiment according to the present disclosure.

FIG. 7 shows a state in which a contactor and a presser are coupled to a housing of a contactor assembly according to an embodiment according to the present disclosure As shown in FIG. 7, the contactor 200 may include a first contacting branch 210 and a second contacting branch 220.

The first contacting branch 210 and the second contacting branch 220 may have the same shape and may be coupled to the opening 110 of the housing 100 while facing away each other vertically. The first contacting branch 210 and the second contacting branch 220 are coupled to the housing 100 while passing through the opening 110 of the housing 100.

The first contacting branch 210 and the second contacting branch 220 have a first support portion 214 and a second support portion 224 at middle ends thereof, respectively. The first support portion 214 and the second support portion 224 come into contact with each other at a position while being fitted into the opening 110.

A folded direction of each side guard 130 of the housing 100 relative to the opening 110 is defined as a rear direction. An opposite direction thereof is defined as a front direction.

In the first contacting branch 210 and the second contacting branch 22, the first support portion 214 and the second support portion 224 come into contact with each other at a position while being fitted into the opening 110.

First, the first contacting branch 210 includes a first contacting portion 212 extending from the first support portion 214 forwardly of the opening 110. The first contacting branch 210 includes a first coupled portion 216 extending from the first support portion 214 rearwardly of the opening 110.

Further, the second contacting branch 220 includes a second contacting portion 222 extending from the second support portion 224 forwardly of the opening 110. The second contacting branch 220 includes a second coupled portion 226 extending from the second support portion 224 rearwardly of the opening 110.

In this connection, the first contacting portion 212 and the second contacting portion 222 extending forwardly of the opening 110 are spaced apart from each other by a predetermined gap.

Distal ends of the first contacting portion 212 and second contacting portion 222 are curved in a direction away from each other such that the bus-bar 12 may be easily inserted into a space defined between the distal ends of the first contacting portion 212 and the second contacting portion 222.

The first coupled portion 216 and the second coupled portion 226 extending rearwardly of the opening 110 are spaced apart from each other by a predetermined gap. A protrusion 410 of the connector 400 may be accommodated in a space defined between the first coupled portion 216 and the second coupled branches 226 spaced apart from each other.

The presser 300 includes a first pressing piece 310 and a second pressing piece 320.

The first pressing piece 310 is fitted into between the first contacting branch 210 and a first front guard 120 of the housing 100. The first pressing piece 310 extends in an elongate manner forwardly and backwardly of the opening 110. A middle portion of the first pressing piece 310 is supported by the first front guard 120. Front and rear ends of the first pressing piece 310 extending forwardly and rearwardly of the opening 110 may press the first contacting portion 212 and the first coupled portion 216 of the first contacting branch 210 toward the second contacting branch 220 respectively.

The second pressing piece 320 is fitted into between the second contacting branch 220 and a second front guard 120 of the housing 100. The second pressing piece 320 extends in an elongate manner forwardly and backwardly of the opening 110. The second pressing piece 320 has a middle portion supported by the second front guard 120. Front and rear ends extending forwardly and rearwardly of the opening 110 may press the second contacting portion 222 and second coupled portion 226 of the second contacting branch 220 toward the first contacting branch 210 respectively.

Accordingly, the first contacting branch 210 and the second contacting branch 220 may have an elastic force to press the contacting portions 212 and 222 and the coupled portions 216 and 226 toward the bus-bar 12 and the protrusion 410 respectively such that the contacting portions 212 and 222 and the coupled portions 216 and 226 contact the bus-bar 12 and the protrusion 410 respectively. However, stronger clamping forces between the contacting portions 212 and 222 and the bus bar 12 and stronger clamping forces between the coupled portions 216 and 226 and the protrusion may be obtained using the first pressing piece 310 and second pressing piece 320.

Each of the first pressing piece 310 and the second pressing piece 320 may be embodied as a leaf spring having a predetermined length and a shape of each of the first contacting branch 210 and the second contacting branch 220.

The connector 400 may be formed of an electrically conductive conductor. The connector 400 may have one end electrically connected to the branching circuit-breaker 20.

The connector 400 includes the protrusion 410 that protrudes outwardly.

The protrusion 410 may have a circular cross section in one embodiment according to the present disclosure. Then, as described above, the protrusion may be accommodated in a space between the first coupled portion 216 and the second coupled portion 226 of the first contacting branch 210 and the second contacting branch 220 respectively forming the contactor 200 and may be coupled to the contactor 200.

The protrusion 410 of the connector 400 has a circular section. Accordingly, the first coupled portion 216 and the second coupled portion 226 accommodating the protrusion 410 therebetween may rotate about the protrusion 410 as a central axis.

Specifically, in the state in which the contactor 200 and the presser 300 are coupled to the housing 100, the housing 100, the contactor 200, and the presser 300 may rotate around the protrusion 410 of the connector 400.

In this way, the contractor 200 may move by a predetermined distance in the vertical direction with respect to the protrusion 410 even when the bus bar 12 coupled to the contactor 200 is not positioned at a correct vertical level. This makes the combination between the contactor 200 and bus-bar 12 to be smoother.

The connector 400 may act as the conductor which electrically connects the branching circuit-breaker 20 and the contactor 200 to each other.

For the contactor assembly 30 according to the present disclosure as described above, the contactor 200 may approach and may be coupled to the bus-bar 12 of the main circuit-breaker 10, and then the contractor 220 may move far away from the bus bar 12 to be separated therefrom. Therefore, in order that only some of a plurality of branching circuit-breakers 20 coupled with the main circuit-breaker 10 needs to be removed therefrom or combined thereto, the operator needs not brake the main circuit-breaker 10.

Further, the contactor 200 according to the present disclosure is securely coupled to the bus bar and the protrusion by the presser 300. Using the elastic force of the presser 300 may allow the contractor 200 to retain the bus-bar 12 and the connector 400. This improves the durability of the contactor 200.

Further, since the housing 100 to which the contactor 200 is coupled includes the both side guards 130 formed by folding a plate at a right angle at both sides of the opening 110, the contactor assembly 30 according to the present disclosure has a small volume.

The interference between the housing and the contactor 200 which may occur due to the small volume of the housing 100 may be prevented using the spacer 132 formed on each side guard 130 of the housing 100.

Although the present disclosure has been described with reference to the drawings exemplified above, the present disclosure is not limited to the embodiments and drawings disclosed in the present disclosure. It is obvious that various modifications may be made by a person skilled in the art within the scope of the technical idea according to the present disclosure. In addition, although effects from configurations according to the present disclosure have not been described explicitly while the above-described embodiment according to the present disclosure has been described, it is obvious that predictable effects from the configurations should be further recognized.

What is claimed is:

1. A contactor assembly connected to a bus-bar of a main circuit-breaker, the assembly including:
   a housing including an opening defined therein;
   a contactor passing through the opening and coupled to the housing, wherein the contactor includes contacting portions projecting forwardly of the opening and coupled portions projecting rearwardly of the opening;
   a presser passing through the opening and coupled to the housing, wherein the presser is interposed between the contactor and the housing, wherein the presser is supported on the housing and presses the contacting portions and the coupled portions; and
   a connector coupled to the coupled portions of the contactor and electrically connected to the contactor,
   wherein the connector includes a protrusion protruding outwardly therefrom and having a circular cross section, wherein the protrusion is configured to be fitted into a space between the coupled portions, wherein the contactor is configured to rotate around the protrusion,
   wherein the housing includes side guards defining both side boundaries of the opening respectively, wherein the connector is connected to the coupled portions while the coupled portions and at least a portion of the connector are received between the side guards, wherein each of the side guards includes a spacer protruding toward a center of the opening, wherein each of both sides of the contactor contacts each spacer such that each of the both sides of the contactor is spaced apart by a predetermined gap from each of the side guards.

2. The contactor assembly of claim 1, wherein the contactor includes a first contacting branch and a second contacting branch, wherein the first contacting branch and the second contacting branch have middle portions received in the opening and being in contact with each other, wherein front ends of the first contacting branch and the second contacting branch in front of the opening are spaced from each other by a first predefined spacing, while rear ends of the first contacting branch and the second contacting branch in the rear of the opening are spaced from each other by a second predefined spacing.

3. The contactor assembly of claim 2, wherein the first contacting branch and the second contacting branch include the coupled portions respectively.

4. The contactor assembly of claim 2, wherein the first contacting branch and the second contacting branch include the contacting portions respectively, wherein an end of the bus-bar is configured to be fitted into a space between the contacting portions.

5. The contactor assembly of claim 2, wherein the presser includes:
   a first pressing piece sandwiched between the first contacting branch and the housing; and
   a second pressing piece sandwiched between the second contacting branch and the housing.

6. The contactor assembly of claim 1, wherein each of the side guards is a plate-like member having a plane perpendicular to an imaginary plane defined by the opening, and the side guards define both sides of the opening respectively.

* * * * *